United States Patent
Achard De La Vente et al.

(10) Patent No.: US 12,472,339 B2
(45) Date of Patent: Nov. 18, 2025

(54) IMPLANTABLE ACCESS DEVICE FOR ACCESSING THE VASCULAR SYSTEM OF A HUMAN OR ANIMAL BODY, PARTICULARLY SUBCUTANEOUSLY IMPLANTABLE ACCESS PORT

(71) Applicant: PFM MEDICAL GMBH, Cologne (DE)

(72) Inventors: Stanislas Marie Achard De La Vente, Canton de Neuchâtel (CH); Cyril Bergeon, Villers le lac (FR)

(73) Assignee: PFM Medical GmbH (DE)

( * ) Notice: Subject to any disclaimer, the term of this patent is extended or adjusted under 35 U.S.C. 154(b) by 878 days.

(21) Appl. No.: 17/754,564

(22) PCT Filed: Oct. 1, 2020

(86) PCT No.: PCT/EP2020/077511
§ 371 (c)(1),
(2) Date: Apr. 6, 2022

(87) PCT Pub. No.: WO2021/078488
PCT Pub. Date: Apr. 29, 2021

(65) Prior Publication Data
US 2024/0058589 A1    Feb. 22, 2024

(30) Foreign Application Priority Data
Oct. 24, 2019    (IT) .................. 102019000019761

(51) Int. Cl.
*A61M 39/02*    (2006.01)
*A61M 39/28*    (2006.01)

(52) U.S. Cl.
CPC ........ *A61M 39/0208* (2013.01); *A61M 39/28* (2013.01)

(58) Field of Classification Search
CPC .......................... A61M 39/0208; A61M 39/28
See application file for complete search history.

(56) References Cited

U.S. PATENT DOCUMENTS

| 4,861,341 A | 8/1989 | Woodburn |
| 5,350,360 A | 9/1994 | Ensminger et al. |
| 5,352,204 A | 10/1994 | Ensminger |
| 5,356,381 A | 10/1994 | Ensminger et al. |

(Continued)

FOREIGN PATENT DOCUMENTS

| CN | 106413776 | 2/2017 |
| DE | 19624320 | 10/1997 |

(Continued)

OTHER PUBLICATIONS

International Search Report from corresponding PCT Appln. No. PCT/EP2020/077511, dated Oct. 26, 2020.

(Continued)

*Primary Examiner* — Shefali D Patel
(74) *Attorney, Agent, or Firm* — Eckert Seamans Cherin & Mellott LLC (57) ABSTRACT

A subcutaneously implantable access device for accessing a vascular system of a human or animal body. The implantable access device includes a port body, a needle entrance with at least one inlet opening for receiving a needle and an outlet opening, and an at least partially flexible catheter for accessing the vascular system of the human or animal body. The at least partially flexible catheter is connected to the outlet opening of the needle entrance, and the needle entrance is connected to the port body and movable relative to the port body between a first, unactuated operating condition that prevents fluid flow through the at least partially flexible catheter and a second, actuated operating condition that allows the fluid flow through the at least partially flexible catheter.

11 Claims, 7 Drawing Sheets

(56) References Cited

U.S. PATENT DOCUMENTS

| | | | |
|---|---|---|---|
| 5,741,228 | A | 4/1998 | Lambrecht et al. |
| 5,848,989 | A | 12/1998 | Villani |
| 5,911,706 | A | 6/1999 | Estabrook et al. |
| 6,007,516 | A | 12/1999 | Burbank et al. |
| 6,056,717 | A | 5/2000 | Finch et al. |
| 6,120,492 | A | 9/2000 | Finch et al. |
| 6,193,684 | B1 | 2/2001 | Burbank et al. |
| 6,506,182 | B2 | 1/2003 | Estabrook et al. |
| 6,565,525 | B1 | 5/2003 | Burbank et al. |
| 7,056,316 | B1 | 6/2006 | Burbank et al. |
| 10,307,581 | B2 | 6/2019 | Hibdon et al. |
| 10,746,035 | B2 | 8/2020 | Frey |
| 2005/0131325 | A1 | 6/2005 | Chen et al. |
| 2007/0016162 | A1 | 1/2007 | Burbank et al. |
| 2009/0306606 | A1 | 12/2009 | Lancette et al. |
| 2010/0286615 | A1 | 11/2010 | Gyrn et al. |
| 2019/0232035 | A1 | 8/2019 | Fedor et al. |

FOREIGN PATENT DOCUMENTS

| | | |
|---|---|---|
| EP | 0332943 | 9/1989 |
| EP | 1016431 | 7/2000 |
| EP | 1245247 | 10/2002 |
| EP | 1629862 | 3/2006 |
| EP | 1765456 | 11/2011 |
| EP | 3381501 | 10/2018 |
| WO | 01/32141 | 5/2001 |
| WO | 2012/064881 | 5/2012 |

OTHER PUBLICATIONS

Written Opinion from corresponding PCT Appln. No. PCT/EP2020/077511, dated Oct. 26, 2020.

Office Action from related Chinese Appln. No. 2020800702633, dated Oct. 23, 2020. English translation attached.

Office Action from related Japanese Appln. No. 2022-521389, dated May 9, 2023. English translation attached.

IMPLANTABLE ACCESS DEVICE FOR ACCESSING THE VASCULAR SYSTEM OF A HUMAN OR ANIMAL BODY, PARTICULARLY SUBCUTANEOUSLY IMPLANTABLE ACCESS PORT

CROSS-REFERENCE TO RELATED APPLICATIONS

This application is a U.S. national stage filing under 35 U.S.C. § 371 of International Application No. PCT/EP2020/077511, filed on Oct. 1, 2020, which claims the benefit of priority to Italian Application No. 102019000019761, filed Oct. 24, 2019, the entire contents of which is incorporated herein.

FIELD

The invention relates to an implantable access port for accessing the vascular system of a human or animal body, particularly subcutaneously implantable access port.

BACKGROUND

During a medical treatment it is sometimes necessary to repeatedly access the vascular system of a human or animal body, for example for infusing therapeutic agents, drugs or such the like, removing body fluids, treating body fluids, injecting contrast agents and/or insertion of medical devices such as cameras, ultra-sound probes, brushes, catheters, catching devices or similar devices. In case of fluid exchange therapies, like for example hemodialysis, hemofiltration, hemodiafiltration, plasmapheresis, ultrafiltration, aquafiltration, n lipid pheresis, hemoperfusion, peritoneal dialysis or the like, devices for accessing the vascular system of a human or animal body which allow a high-volume fluid flow are preferred.

From the prior art a variety of strategies are known for accessing the vascular system of a human or animal body, like for example direct vessel cannulation, short and long term catherization and implantation of subcutaneous port systems.

A temporary access to the vascular system of the human or animal body can be simply provided by a direct percutaneous introduction of a needle through the skin of the human or animal body into a vessel of the vascular system of the human or animal body. Such an approach is the least expensive and simplest form of accessing the vascular system of the human or animal body and is particularly suitable for short term applications like for example intravenous drug delivery, removal of blood or the like. However, repeated introduction of a needle through the skin of the human or animal body into a vessel of the vascular system of the human or animal body can result in vessel thrombosis, stenosis and formation of pseudo-aneurisms, as well as infections.

Transcutaneous devices, like short and long-term catheters, are used to address the problems of repeated direct percutaneous introduction of a needle through the skin of the human or animal body into a vessel of the vascular system of the human or animal body. Such transcutaneous devices can be flexible cannulae, which are inserted percutaneously into the region of interest such as a blood vessel or cavity in the human or animal body. However, although transcutaneous devices deal with the problems of a direct percutaneous introduction of a needle through the skin of the human or animal body into a vessel of the vascular system of the human or animal body they often cause complications due to infections. The infection usually infects the point where the device passes through the skin of the human or animal body or even the vascular system of the human or animal body itself. Thus, such transcutaneous devices can cause local or even systemic infections.

Therefore, a direct percutaneous introduction of a needle through the skin of the human or animal body into a vessel of the vascular system of the human or animal body or use of a transcutaneous catheter are not well suited for long term applications or for extracorporeal procedures that must be repeated periodically, like for example hemodialysis, hemofiltration, hemodiafiltration, plasmapheresis, ultrafiltration, aquafiltration, n lipid pheresis, hemoperfusion, peritoneal dialysis or the like.

To deal with the above problems varieties of subcutaneously implanted ports have been proposed over the years for long term and/or periodically repeated accesses to the vascular system of the human or animal body. A typical subcutaneously implanted port has an access region for receiving a needle or access catheter, a fluid flow path through the port and a subcutaneously catheter attached to a vessel of the vascular system of the human or animal body. Thus, a fluid flow path is provided from the access catheter through the subcutaneously implanted port and the subcutaneously catheter to the vascular system of the human or animal body.

The most common type of subcutaneously implanted ports, like for example disclosed in U.S. Pat. No. 6,056,717, comprises a housing with a port chamber for receiving an introduced needle. The surface of the port chamber next to the skin of the human or animal body is enclosed by a high-density self-sealing septum, typically made of silicone rubber. A subcutaneously implanted catheter, which communicates with a vein or other site within the human or animal body, is connected and in fluid connection to the port chamber. Implantation of such devices generally proceeds by making a small subcutaneous pocket in an appropriate area of the human or animal body under local anaesthesia. The subcutaneously implanted catheter is tunnelled to the desired infusion site.

Since the septum faces towards the skin of the human or animal body and the subcutaneously implanted catheter runs substantially parallel to the skin of the human or animal body, there exists a 90° bend in the flow path from the introduced needle, which is perpendicular to the skin of the human or animal body, to the subcutaneously implanted catheter. Especially for high flowrates this can result in damages to the blood, so-called hemolysis.

To avoid damaging or coring of the septum a special needle, like so-called port or Huber needle, is introduced through the skin of the human or animal body and the septum into the port chamber. Damaging or coring of the septum is avoided by a special cut of the needle. After the medical treatment has been finished the needle is withdrawn from the port chamber.

Since large diameter needles can damage the rubber septum used for sealing the port chamber the fluid flow rate is limited for these known subcutaneously implanted port devices. Further, it is desirable to limit the height of the subcutaneously implanted port because of optical reason and the local stress imposed on the skin of the human or animal body. However, this results in a limited height of the port chamber as well as a thinner port septum; so a small displacement of the introduced needle can cause an easier retraction of the needle out of the port chamber because of friction reduction induced by the thinner septum. In case where toxic materials are being infused, like during chemotherapy, the retraction of the needle out of the port chamber can cause local tissue damage, which may lead to further surgical treatments like corrective surgery or removal of tissue.

Moreover, due to the at least one 90° bend in the fluid flowing path it is difficult or even impossible to clear the subcutaneously implanted port if e.g. thrombosis occurs. A thrombus can result in serious patient injuries like e.g. pulmonary embolism or even blockage. To clear a subcutaneously implanted port it is necessary to feed a cleaning wire through the hypodermic needle into the port chamber and further through the subcutaneously implanted catheter. However, it is very difficult to feed the cleaning wire from the port chamber into the subcutaneously implanted port due to the at least one 90° bend. In case the subcutaneously implanted port cannot be cleaned it has to be replaced to avoid the risk of serious patient injuries.

To overcome the problems associated with the perpendicular introduction of the needle into the port chamber it has been proposed for example in DE 196 24 320 C1, EP 0 332 943 B1, EP 1 629 862 A1, EP 1 765 456 B1, U.S. Pat. No. 5,848,989 or U.S. Pat. No. 4,861,341 to use a tube shaped subcutaneously implanted port, wherein the septum is arranged in such a way that the needle is introduced substantially parallel to the skin of the human or animal body. This results in a substantially straight fluid flowing path through the subcutaneously implanted port. Due to the substantially straight fluid flowing path a cleaning wire or another device can be easily introduced through the port chamber into the subcutaneously implanted catheter. Further, the length of the catheter housing can be enhanced without causing more stress to the skin in the area of the implantation site. Thus, the length of the port chamber can be enhanced and the needle can be introduced further into the port chamber and thereby significantly reducing the risk of an accidental retraction of the needle out of the port chamber.

Further, it is known from the prior art, like example from U.S. Pat. Nos. 6,007,516, 6,120,492 6,193,684 B1 and 7,056,316 B1, to replace the septum by a valve assembly. Due to the valve assembly fistula needles can be introduced into the subcutaneously implanted port without damaging any septum. Usually, the valve is actuated by moving a part of the valve by the introduced needle or by advancing the introduced needle through the valve, like e.g. through a leaflet valve assembly. This even allows to use larger diameter needles, which increases the maximum achievable fluid flowing rate. U.S. Pat. No. 6,565,525 B1 further discloses a dual port vascular access assembly comprising first and second access ports. This vascular access assembly is designed to close the second access port in the absence of an access tube in the first access port. Thus, blood withdrawal will be automatically terminated upon cessation of blood returned to due to loss of the return access tube in the first access port. However, according to the aforementioned prior art documents the needles are introduced perpendicular to the skin of the human or animal body and thus, they still suffer from the above-mentioned problems associated with the perpendicular introduction of the needle into the port chamber.

U.S. Pat. No. 5,350,360, EP 1 016 431 A1, U.S. Pat. Nos. 5,741,228, 5,356,381 and 5,352,204 each disclose a subcutaneously implantable access port with a housing having a funnel shaped inlet orifice leading to a reduced diameter guide passageway. An articulating valve, which may take various forms including leaflet type valves or self-collapsing tubular valves, are placed in line with the access port housing. An external filament such as a needle, guide wire, optical fibre, or external catheter can be introduced into the access device and fed through the housing to penetrate the articulating valve.

U.S. Pat. Nos. 5,911,706 and 6,506,182 B2 each disclose an implantable single or dual-lumen device for repeated accessing vessels within a human or animal body. The device uses a resilient material to form a seal and has a smooth streamlined flowpath with no flow discontinuity. The device is joined to a subcutaneously implanted catheter, such that fluids can be extracted from or injected into the vessel to be accessed. The device is designed for the high flowrates, on the order of 150 and greater millilitres per minute, associated with fluid exchange therapies. A smooth flow streaming is important to minimize damage to the blood. A corresponding straight-needle apparatus is designed to mate and lock with the access device, where alignment and open flowpath is ensured. A valve seal incorporates opposing very hard surfaced guide elements that are retained and in intimate contact with the seal itself. The needle assembly pushes open these guide elements which open the seal before the needle point reaches the seal material.

Especially in case of fluid exchange therapies, like for example hemodialysis, hemofiltration, hemodiafiltration, plasmapheresis, ultrafiltration, aquafiltration, n lipid pheresis, hemoperfusion, peritoneal dialysis or the like, which require a high-volume fluid flow there is a need of devices for accessing the vascular system of a human or animal body which guarantee that the maximum fluid flow rate is achieved. Further, since fluid exchange therapies usually need more than one hour the device for accessing the vascular system together with the inserted needle should be as comfortable as possible for the patient, i.e. have a low profile and be as close as possible to the skin of the patient.

SUMMARY

These objects are solved according to the invention by an implantable access device for accessing the vascular system of a human or animal body, particularly subcutaneously implantable access port, comprising:
a port body,
a needle entrance with at least one inlet opening for receiving a needle and an outlet opening,
an at least partially flexible catheter for accessing the vascular system of the human or animal body connected to the outlet opening of the needle entrance,
wherein the needle entrance is connected to the port body and movable relative to the port body between a first, unactuated operating condition and a second, actuated operating condition, and
further comprising clamping means for clamping the at least partially flexible catheter in the first, unactuated operating condition and unclamping the at least partially flexible catheter in the second, actuated operating condition, so that in the first, unactuated operating condition the clamping means prevent a fluid flow through the at least partially flexible catheter and in the second, actuated operating condition allow a fluid flow through the at least partially flexible catheter.

According to the invention the passageway through the implantable access device, i.e. from the inserted needle, through the needle entrance and the catheter attached to the outlet opening of the needle entrance, is completely closed in the first, unactuated operating condition and completely opened in the second, actuated operating condition. Therefore, for example the implantable access device comprises clamping means, which are actuated, i.e. opened and closed, by the relative movement of the needle entrance to the port body.

The passageway through the implantable access device is completely closed respectively completely opened by the clamping means. The clamping means are designed and arranged such that the clamping means clamp a flexible portion of the catheter in the first, unactuated operating condition, so that the passageway through the catheter is closed. In the second, actuated operating condition the clamping means do not clamp the flexible portion of the catheter and the passageway through the catheter is completely open. Thus, the implantable access device is actuated by moving the needle entrance relative to the port body, which can be performed by inserting the needle into the needle entrance.

In a variant of the invention the implantable access device further comprises guiding means for guiding the movement between the port body and the needle entrance. The guiding means define the possible relative movement between the needle entrance and the port. Thus, the needle entrance cannot move freely with respect to the port body but only in a defined range. The guiding means define the movement necessary to actuated/unactuated the implantable access device. The guiding means are for example protrusions like cams and corresponding recesses or surfaces arranged on the needle entrance respectively port body. The recesses or surfaces define the path of movement and the protrusions are locked in the recesses or follow the surfaces to the define the path of movement.

Pursuant to a variant of the invention the guiding means are implemented by a separate component arranged between the port body and the needle entrance. For example, the separate guiding means are connected to the movable needle entrance and fixed relative thereto, e.g. by snap fit connections. The needle entrance and the attached guiding means are inserted into the port body. The separate guiding means provide the recesses or guiding surfaces for protrusions arranged on the port body. During assembly of the implantable access port the movable needle entrance is inserted into the separate guiding means. The separate guiding means are easier to manufacture than a port body with recesses or guiding surfaces. Furthermore, such an implantable access port is easier to assemble.

According to a preferred variant of the invention the guiding means are designed to lock the needle entrance in the first, unactuated operating condition and in the second, actuated operating condition. This is for example achieve by providing pockets or similar cut-outs in the recesses or surface path, so that the protrusions are arranged in these pockets in the first, unactuated operating condition respectively in the second, actuated operating condition and a special movement is necessary to move the protrusions out of the pocket to either actuate or unactuated the implantable access device by a movement of the needle entrance relative to the port body. Since the locking means of the guiding means are locked in the first, unactuated operating condition respectively the second, actuated operating condition it is guaranteed that the passageway through the inventive implantable access device is either completely closed or completely opened. Thus, the locking means provide two stable operating conditions, a so-called bi-stable mechanism.

In a preferred variant of the invention the clamping means further comprise a spring arranged between the port body and the clamping means, particularly for locking the clamping means in the first, unactuated operating condition and/or in the second, actuated operating condition. Thus, the clamping means are spring biased relative to the port body, thereby for example locking the clamping means in the first, unactuated operating condition and/or in the second, actuated operating condition. Due to the spring a certain operating force is necessary, so that an accidental operation of the implantable access device is further avoided.

Pursuant to a variant of the invention the movement of the needle entrance relative to the port body from the first, unactuated operating condition to the second, actuated operating condition comprises first a translational movement in the direction of the insertion of the needle into the needle entrance and afterwards a pivoting movement with respect to the translational movement. The two distinct movements necessary to actuate the implantable access device have the advantage, that the implantable access device is not actuated by accident. The first, translational movement corresponds to the direction of the movement during the insertion of the needle into the needle entrance. Thus, during normal operation of the implantable access device, i.e. insertion of the needle into the needle entrance, the first necessary movement is performed more or less automatically. The second distinct movement, i.e. the pivoting movement, is particularly used for locking the needle entrance in the second, actuated operating condition. In contrast to this, the movement of the needle entrance relative to the port body from the second, actuated operating condition to the first, unactuated operating condition comprises only a movement in one direction, particularly a pivoting movement. In this way the passageway through the implantable access device is easily closed.

According to a variant of the invention the clamping means further comprise rotation driver for rotationally connecting the clamping means to the needle entrance or separate guiding means. The clamping means are arranged inside the port body and may be moved against spring forces by the translational movement of the needle entrance relative to the port body in the same translational movement. To enable a further pivoting movement of the needle entrance relative to the port body the clamping means further comprise rotation driver to enable a rotational movement of the needle entrance or the separate guiding means relative to the port body.

In a variant of the invention the needle entrance comprises an inlet opening with a funnel to guide the needle into the needle entrance. The funnel helps to insert the needle into the needle entrance. Furthermore, the funnel allows to use slightly different locations for inserting the needle into the skin of the patient because it is afterwards guided by the funnel into the needle entrance.

Pursuant to a preferred variant of the invention the implantable access device comprises a flexible socket between the port body and the moveable needle entrance. Since the implantable access port is subcutaneously implanted in the human or animal body and since the needle entrance is movable relative to the port body it is likely that tissue grows in the area between the port body and the movable entrance. If tissue grows in this area and the needle entrance is moved relative to the port body it is possible that this tissue is clamped, pinch or otherwise affected by the relative movement of the needle entrance to the port body, which can be unpleasant for the patient. To avoid tissue to grow between the needle entrance and the port body a flexible socket is arranged between the port body and the needle entrance. The socket is flexible to allow the relative movement, but still prevents tissue growth in this area.

According to a variant of the invention the implantable access device, particularly the port body, comprises a strain relief for the at least partially flexible catheter. The strain relief is preferably attached to the outlet of the port body. The strain relief avoids any kinking of the at least partial flexible catheter, which could reduce the inner diameter of the catheter.

Pursuant to a preferred variant of the invention the clamping means comprise at least two jaws for clamping the at least partially flexible catheter, the jaws are preferably arranged on opposing sides of the catheter.

In an advantageous variant of the invention the clamping means further comprise cam follower designed to cooperate with the port body, particularly with cam slopes of the port body, to push the jaws towards the at least partially flexible catheter in the first, unactuated operating condition and release the jaws from the at least partially flexible catheter in the second, actuated operating condition. This is an easy and cheap way to implement the clamping means for clamping the at least partially flexible catheter in the first, unactuated operating condition and unclamping the at least partially flexible catheter in the second, actuated operating condition. The cam followers of the clamping means and the cam slopes of the port body are surfaces of the clamping means and port body that cooperate together to operate the clamping means, i.e. to push the at least two jaws together to clamp the at least partially flexible catheter in the first, unactuated operating condition, and to release the jaws from the at least partially flexible catheter in the second, actuated operating condition.

BRIEF DESCRIPTION OF THE DRAWINGS

In the following the invention will be further explained with respect to the embodiments shown in the attached figures. It shows.

DETAILED DESCRIPTION

Figure 1:
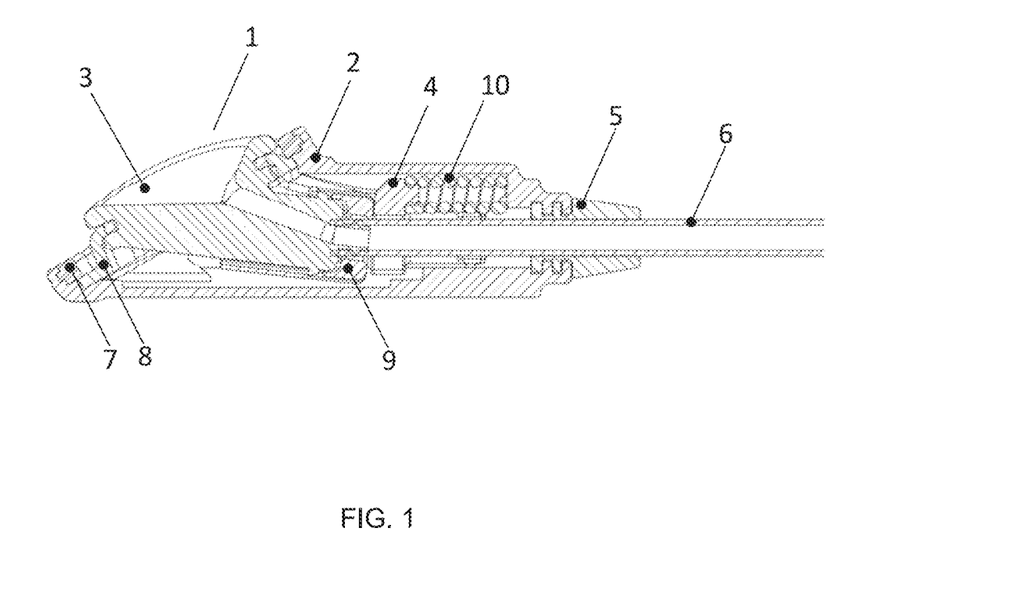
FIG. 1 a cross-sectional view of a first embodiment of an implantable access device according to the invention, FIG. 2 a perspective view of a movable entrance for an implantable access device according to the invention, FIG. 3 a top view and a side view of a port body for an implantable access device according to the invention, FIG. 4 a perspective view of clamping means for an implantable access device according to the invention, FIG. 5 a perspective view of a separate guiding means for an implantable access device according to the invention, FIG. 6 a perspective view of a flexible socket for an implantable access device according to the invention, FIG. 7 a perspective view of a fixation ring for a flexible socket, FIG. 8 cross-sectional views of an unactuated and an actuated implantable access device according to the invention, and FIG. 9 cross-sectionals views of an implantable access device according to the invention showing the movement of the movable needle entrance relative to the port body.

FIG. 1 shows a cross-sectional view of a first embodiment of an implantable access device 1 for accessing the vascular system of a human or animal body, particularly subcutaneously implantable access port, according to the invention.

The implantable access device 1 comprises a port body 2 and a needle entrance 3, wherein the needle entrance 3 is connected to the port body 2 and movable relative to the port body 2 between a first, unactuated operating condition and a second, actuated operating condition.

The needle entrance 3 has at least one inlet opening 34 for receiving a needle and an outlet opening 33. The inlet opening 34 of the needle entrance 3 is for example designed to receive a 15 G needle for fluid exchange therapies. Furthermore, the inlet opening 34 comprises a funnel or is funnel shaped to guide the needle into the inlet of the needle entrance 3.

The implantable access device 1 further comprises an at least partially flexible catheter 6 for accessing the vascular system of the human or animal body. The catheter 6 is connected with one end to the outlet opening 33 of the needle entrance 3 and with the other end to the vascular system of the human or animal body. Thus, the catheter 6 can provide a fluid flow path from the implantable access device 1, particularly the needle entrance 3 to the vascular system of the human or animal body.

According to the invention the implantable access device 1 further comprises clamping means 4 for clamping the at least partially flexible catheter 6 in the first, unactuated operating condition and unclamping the at least partially flexible catheter 6 in the second, actuated operating condition, so that in the first, unactuated operating condition the clamping means 4 prevent a fluid flow through the at least partially flexible catheter 6 and in the second, actuated operating condition allow a fluid flow through the at least partially flexible catheter 6.

The implantable access device 1 shown in FIG. 1 further comprises guiding means 9 for guiding the movement between the port body 2 and the needle entrance 3, which are implemented by a separate component arranged between the port body 2 and the needle entrance 3. The guiding means are designed to lock the needle entrance 3 in the first, unactuated operating condition and in the second, actuated operating condition.

The clamping means 4 further comprise a spring 10 arranged between the port body 2 and the clamping means 4, particularly for locking the clamping means 4 in the first, unactuated operating condition and/or in the second, actuated operating condition.

According to the embodiment of FIG. 1 the movement of the needle entrance 3 relative to the port body 2 from the first, unactuated operating condition to the second, actuated operating condition comprises first a translational movement in the direction of the insertion of the needle into the needle entrance 3 and afterwards a pivoting movement with respect to the translational movement, particularly an upward or downward pivotable movement.

Between the port body 2 and the movable needle entrance 3 a flexible socket 8 is arranged. The flexible socket 8 is attached to the port body 2 by means of a fixation ring 7 and to the movable needle entrance 3 by arranging a part of the flexible socket 8 in a recess/groove 35 of the movable needle entrance 3.

The implantable access device 1 further comprises a strain relief 5 for the at least partially flexible catheter 6, which is attached to the port body 2 opposite to the movable needle entrance 3.

Figure 2:
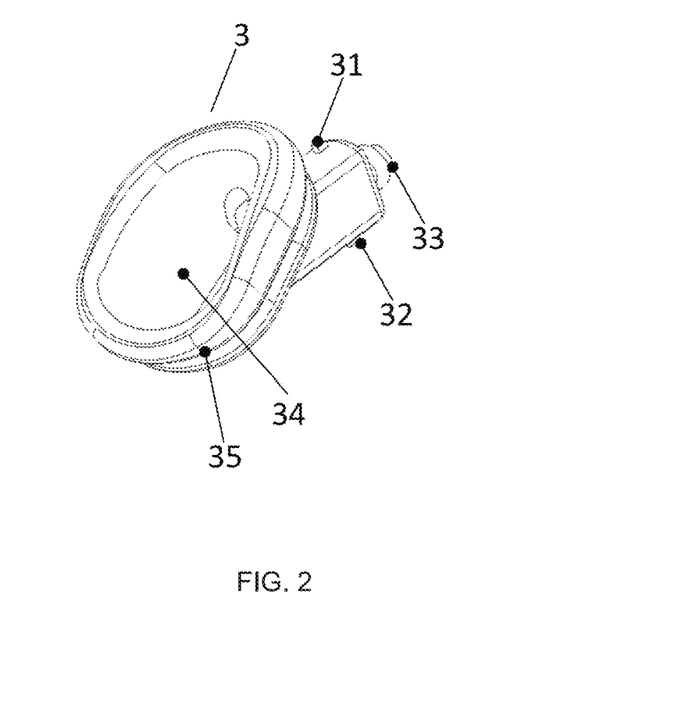

FIG. 2 shows a perspective view of a movable entrance 3 for an implantable access device 1 according to the invention. The needle entrance 3 comprises snap fit connections 31, 32 for connecting the needle entrance 3 to the port body 2 respectively to the separate guiding means 9. The needle entrance 3 has output 33 for connecting the catheter 6 to the needle entrance 3. The connection between the output 33 and the catheter 6 can be improved connecting the needle entrance 3 to separate guiding means 9, wherein the guiding means 9 are arranged to improve the connection between the output 33 of the needle entrance 3 and catheter 6. As can be seen from FIG. 2 the inlet opening 34 of the needle entrance 3 is funnel shaped to guide the needle into the inlet of the needle entrance 3. Furthermore, the needle entrance 3 comprises a groove for receiving the flexible socket 8 and fix the flexible socket 8 to the movable needle entrance 3 during movement thereof.

Figure 3:
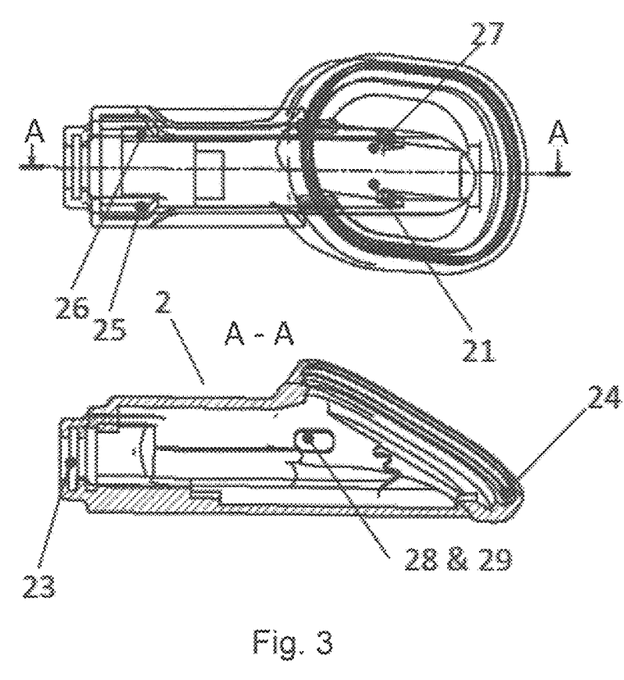

FIG. 3 shows a top view and a side view of a port body 2 for an implantable access device 1 according to the invention. The port body 2 comprises cam teeth 21, 27 for cooperating with separate guiding means 9 to define the relative movement between the movable needle entrance 3 and the port body 2. Particularly, the cam teeth 21, 27 will operate together will guiding surfaces 93, 97 of the separate guiding means 9. The port body 2 further comprises cam slopes 25, 26 to cooperate with cam follower 45, 46 of the clamping means 4 to operate the clamping means 4 in the first, unactuated operating condition and the second, actuated operating condition. The port body 2 further has a slot for receiving a part of strain relief 5 for connecting the strain relief 5 to the port body 2. A further slot 24 is provided for receiving the fixation ring 7 used to fix the flexible socket 8 to the port body 2. Port body 2 further has snap fit pockets 28, 29 for receiving snap fits 91 of the separate guiding means 9. The snap fit connection between the port body 2 and the separate guiding means 9 allows a relative movement between the port body 2 and the separate guiding means 9, e.g. by providing longitudinal snap fit pockets 28, 29.

Figure 4:
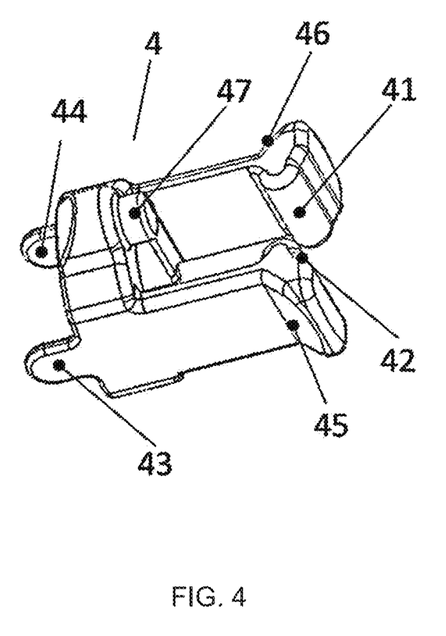

FIG. 4 shows a perspective view of clamping means 4 for an implantable access device 1 according to the invention. The clamping means 4 of FIG. 4 comprise two jaws 41, 42, which can clamp the at least partially flexible catheter 6 from opposing sides. The flexible part of the catheter 6 is deformed by pushing the two jaws 41, 42 together, thereby clamping the flexible catheter 6. The two jaws 41, 42 are pushed towards each other by cam follower 45, 46 which cooperate with cam slopes 25, 26 of the port body 2. The clamping means 4 further comprise connecting protrusion 47 for connecting the spring 10 to the clamping means 4. The other end of the spring 10 abuts inner surface of the port body 2, so that the spring 10 imposes a force on the clamping means 4 to keep the clamping means 4 in the first, unactuated operating condition or in the second, actuated operating condition by cooperating with the guiding means 9. To allow the pivoting movement of the needle entrance 3 relative to the port body 2 and the clamping means 4, the clamping means 4 further comprises rotational drivers 43, 44.

Figure 5:
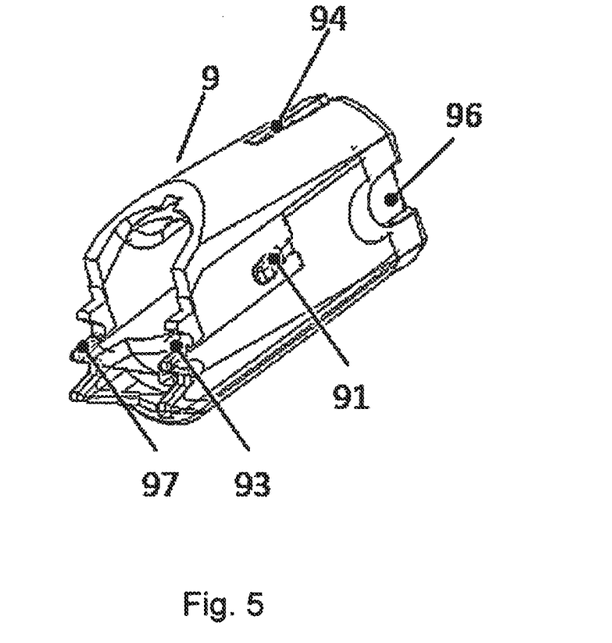

FIG. 5 shows a perspective view of a separate guiding means 9 for an implantable access device 1 according to the invention. The guiding means 9 are designed to guide the relative movement between the needle entrance 3 and the port body 2. The needle entrance 3 is connected to the separate guiding means 9 by snap fits 31, 32. The guiding means 9 are connected to the port body 2 by snap fits 91, 92, which engage with longitudinal snap fit pockets 28, 29 of the port body 2, so that the guiding means 9 together with the needle entrance 3 are relative movable to the port body 2. The guiding means 9 drive the clamping means 4 with slots 96, 98, that are cooperating with rotation drivers 43, 44 of the clamping means 4. The guiding means 9 comprise guiding surfaces 93, 97 cooperating with cam teeth 21, 27 of the port body 2. Due to the force of the spring 10 the cam teeth 21, 27 of the port body 2 follow the guiding surfaces 93, 97 of the guiding means 9. The guiding surfaces 93, 97 define the necessary relative movement of the needle entrance 3 to the port body 2 to transfer the implantable access device 1 from the first, unactuated operating condition to the second, actuated operating condition. According to the guiding surfaces 93, 97 of the guiding means 9 the movement of the needle entrance 3 relative to the port body 2 from the first, unactuated operating condition to the second, actuated operating condition first requires a translational movement in the direction of the insertion of the needle into the needle entrance 3 and afterwards a pivoting movement with respect to the translational movement. To return from the second, actuated operating condition to the first, unactuated operating condition preferably only a pivoting movement of the needle entrance 3 relative to the port body 2 is necessary. The guiding surfaces 93, 97 comprise pockets to keep the implantable access device 1 in the first, unactuated operating condition respectively in the second, actuated operating condition until the necessary movements of the needle entrance 3 relative to the port body 2 have been performed. Thus, the implantable access device 1 has two stable operating conditions, i.e. it is a bi-stable system. The guiding means 9 further comprise snap fit pocket 94 for snap fit 31 of the needle entrance. Opposing to snap fit pocket 94 another snap fit pocket (not shown) is arranged for snap fit 32 of the needle entrance 3. The guiding means 9 further support the fixation of the catheter 6 to the outlet 33 of the needle entrance 3 by exerting a radial force onto catheter 6 pressing the catheter 6 radially to the output 33.

Figure 6:
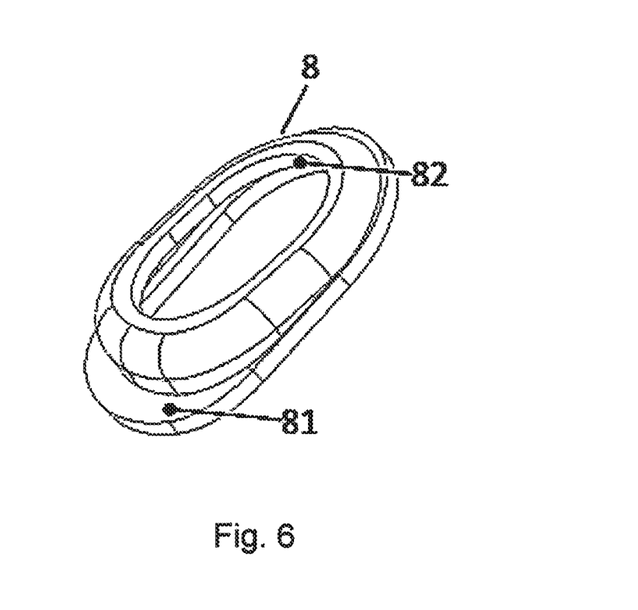
Figure 7:
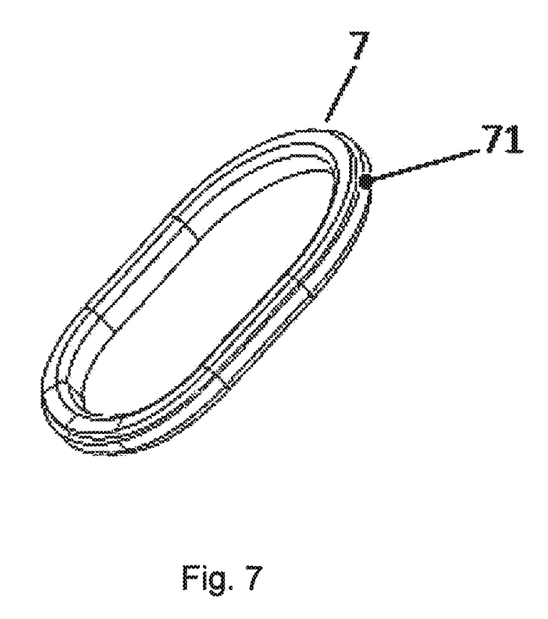

FIG. 6 shows a perspective view of a flexible socket 8 for an implantable access device 1 according to the invention. The flexible socket 8 prevents any tissue growth between the movable needle entrance 3 and the port body 2. The flexible socket 8 is fixed to the port body 2 by flange 81, which is compressed by fixation ring 7 to the port body 2 and to the movable needle entrance 3 by arranging flange 82 in socket groove 35 of the needle entrance 3. The fixation ring 7 is shown in a perspective view in FIG. 7. The fixation ring 7 is connected to port body 2 by snap fit 71.

Figure 8:
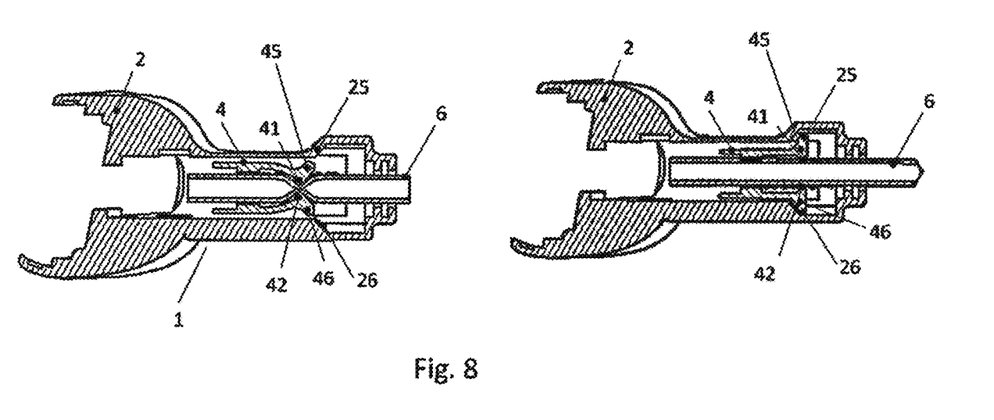

FIG. 8 shows cross-sectional views of an unactuated and an actuated implantable access device 1 according to the invention. The left part of FIG. 8 shows the implanted access device 1 in a first, unactuated operating condition. In this first, unactuated operating condition the clamping means 4 are forced by spring 10 into the left direction of FIG. 8 and held there due to the guiding means 9. Due to this spring force the jaws 41 and 42 of the clamping device 4 deform the flexible catheter 6 and thereby fluidly close the catheter 6. The jaws 41, 42 deform the catheter 6 because the cam followers 45, 46 of the clamping means 4 cooperate with cam slopes 25, 26 of the port body 2. In the right figure of FIG. 8 the implantable access device is shown in the second, actuated operating condition. The camping device 4 has been pushed against the spring force to the right of FIG. 8 by relative movement of the needle entrance 3 to the port body 2. The implantable access device 1 is stable in this shown second, actuated operating condition due to the configuration of the guiding means 9. In this second, actuated operating condition the cam followers 41, 42 are no longer pushed towards the catheter 6 by cam slopes 25, 26 and the catheter 6 is not deformed, i.e. fluidly open.

Figure 9:
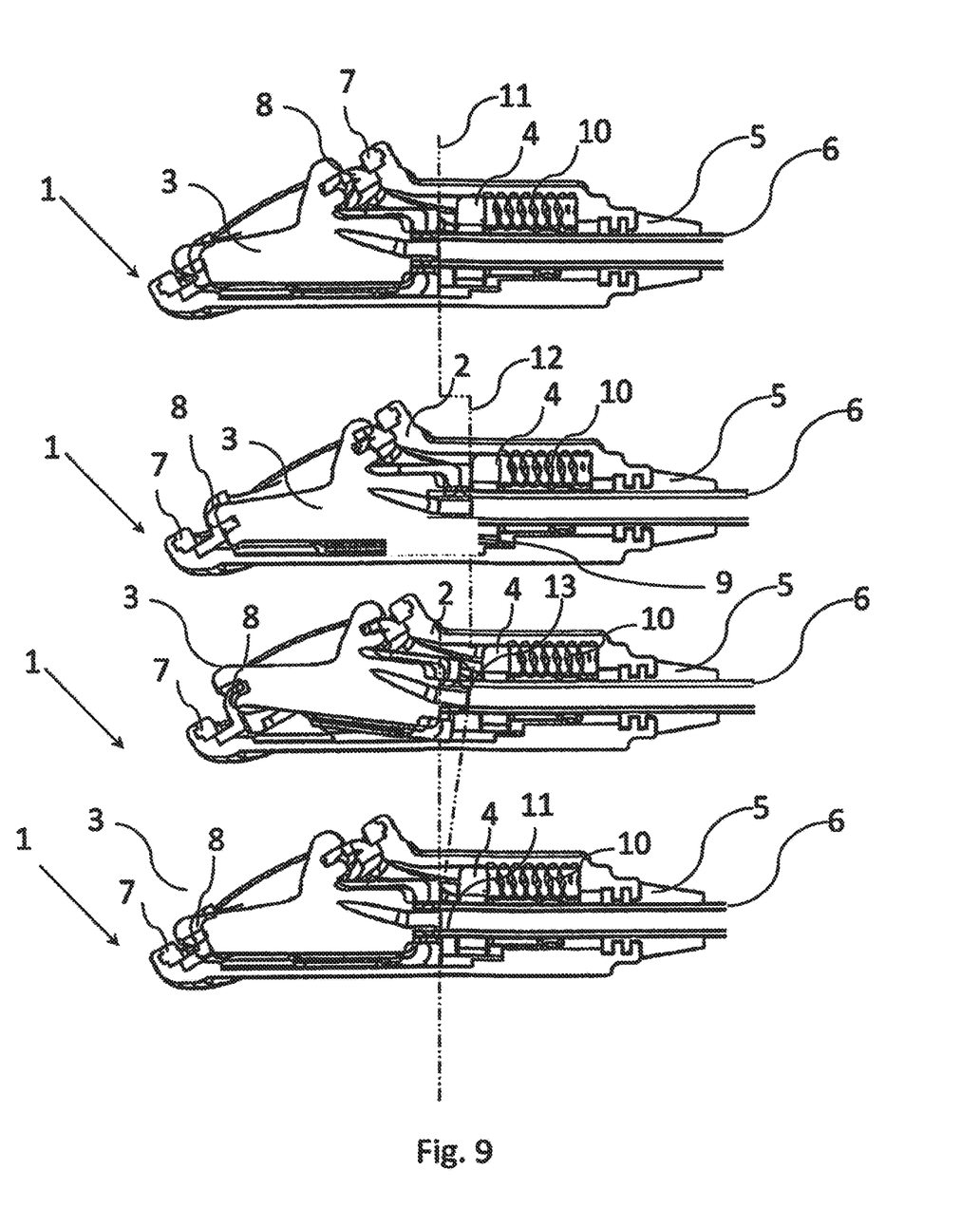

FIG. 9 shows cross-sectionals views of an implantable access device 1 according to the invention showing the movement of the movable needle entrance 3 relative to the port body 2. The implantable access device shown in FIG. 9 corresponds to the implantable access device 1 shown in FIG. 1, so we refer to above detailed description of the implantable access device 1. In the top figure of FIG. 9 the implantable access device 1 is in the first, unactuated operating condition, also corresponding to the left figure of FIG. 8. To transfer the implantable access device 1 from the first, unactuated operating condition to the second, actuated operating condition first a translational movement of the needle entrance 3 relative to the port body 2 in the direction of the needle insertion is performed. The second figure of FIG. 9 shows the implantable access device 1 after this translational movement has been performed. The translational movement is indicated in FIG. 9 by lines 11, 12, which has shifted translational from the top figure to the second figure of FIG. 9. Secondly, the needle entrance 3 is pivoted relative to the port body 2. This pivoting movement is indicated by inclined line 13 relative to line 12. This corresponds to the second, actuated operating condition. After another pivoting movement of the needle entrance 3 to port body 2 the implantable access device 1 returns to the first, unactuated operating condition due to the force of spring 10.

LIST OF REFERENCE NUMERALS

1 Implantable access device
2 port body
3 needle entrance
4 clamping means
5 strain relief
6 catheter
7 ring
8 flexible socket
9 guiding means
10 spring
11 line indicating first, unactuated operating condition
12 line indicated translational movement
13 line indicating pivoting movement and second, actuated operating condition
21 cam teeth
23 slot (strain relief)
24 slot (ring)
25 cam slope
26 cam slope
27 cam teeth
28 snap fit pocket
29 snap fit pocket
31 snap fit
32 snap fit
33 outlet opening
34 inlet opening
35 socket groove
41 jaw
42 jaw
43 rotation driver
44 rotation driver
45 cam follower
46 cam follower
47 connecting protrusion (spring)
71 snap fit
81 flange
82 flange
91 snap fit
93 guiding surface (position lock)
94 snap fit pocket
96 slot for clamping means
97 guiding surface (position lock)

What is claimed is:

1. A subcutaneously implantable access device for accessing a vascular system of a human or animal body, the implantable access device comprising:
a port body;
a needle entrance with at least one inlet opening for receiving a needle and an outlet opening;
an at least partially flexible catheter for accessing the vascular system of the human or animal body connected to the outlet opening of the needle entrance,
wherein the needle entrance is connected to the port body and movable relative to the port body between a first, unactuated operating condition and a second, actuated operating condition;
further comprising clamping means for clamping the at least partially flexible catheter in the first, unactuated operating condition and unclamping the at least partially flexible catheter in the second, actuated operating condition, so that in the first, unactuated operating condition the clamping means prevent a fluid flow through the at least partially flexible catheter and in the second, actuated operating condition allow the fluid flow through the at least partially flexible catheter; and
wherein the movement of the needle entrance relative to the port body from the first, unactuated operating condition to the second, actuated operating condition comprises first a translational movement in a direction of an insertion of the needle into the needle entrance and afterwards a pivoting movement with respect to the translational movement.

2. The device according to claim 1, further comprising guiding means for guiding the movement between the port body and the needle entrance.

3. The device according to claim 2, wherein the guiding means are implemented by a separate component arranged between the port body and the needle entrance.

4. The device according to claim 2, wherein the guiding means are designed to lock the needle entrance in the first, unactuated operating condition and in the second, actuated operating condition.

5. The device according to claim 4, comprising a spring arranged between the port body and the clamping means configured to lock the clamping means in the first, unactuated operating condition and/or in the second, actuated operating condition.

6. The device according to claim 1, wherein the clamping means further comprise a rotation driver for rotationally connecting the clamping means to the needle entrance or separate guiding means.

7. The device according to claim 1, wherein the at least one inlet opening of the needle entrance comprises a funnel to guide the needle into the needle entrance.

8. The device according to claim 1, further comprising a flexible socket between the port body and the needle entrance.

9. The device according to claim 1, further comprising strain relief for the at least partially flexible catheter, which is attached to the port body.

10. The device according to claim 1, wherein the clamping means comprise at least two jaws for clamping the at least partially flexible catheter, the at least two jaws being arranged on opposing sides of the at least partially flexible catheter.

11. The device according to claim 10, wherein the clamping means further comprise a cam follower designed to cooperate with cam slopes of the port body to push the at least two jaws towards the at least partially flexible catheter in the first, unactuated operating condition and release the at least two jaws from the at least partially flexible catheter in the second, actuated operating condition.

\* \* \* \* \*